(12) United States Patent
Kim et al.

(10) Patent No.: US 8,580,419 B2
(45) Date of Patent: Nov. 12, 2013

(54) SECONDARY BATTERY WITH IMPROVED STORAGE CHARACTERISTICS AND METHOD FOR MANUFACTURING THE SAME

(75) Inventors: Yo Jin Kim, Daejeon (KR); Seung Don Choi, Daejeon (KR); Han Ho Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/593,695

(22) Filed: Aug. 24, 2012

(65) Prior Publication Data

US 2012/0321933 A1 Dec. 20, 2012

Related U.S. Application Data

(63) Continuation of application No. 12/681,798, filed as application No. PCT/KR2008/006856 on Nov. 21, 2008, now Pat. No. 8,277,981.

(30) Foreign Application Priority Data

Nov. 21, 2007 (KR) ........................ 10-2007-0119118

(51) Int. Cl.
*H01M 2/16* (2006.01)
*B05D 5/12* (2006.01)

(52) U.S. Cl.
USPC ........................... 429/144; 427/126.3

(58) Field of Classification Search
USPC ............................. 429/144; 427/126.7, 126.4
See application file for complete search history.

(56) References Cited

U.S. PATENT DOCUMENTS

| | | | |
|---|---|---|---|
| 3,953,241 A | 4/1976 | Langer et al. | |
| 3,967,978 A | 7/1976 | Honda et al. | |
| 6,416,906 B1 | 7/2002 | Smith et al. | |
| 6,444,343 B1 * | 9/2002 | Prakash et al. | 429/493 |
| 2003/0157413 A1 | 8/2003 | Chen et al. | |
| 2004/0142246 A1 | 7/2004 | Han et al. | |
| 2005/0277027 A1 | 12/2005 | Kim et al. | |
| 2006/0008700 A1 | 1/2006 | Yong et al. | |
| 2006/0093922 A1 | 5/2006 | Kim et al. | |
| 2007/0009803 A1 | 1/2007 | Kim et al. | |
| 2007/0207384 A1 | 9/2007 | Nakura | |
| 2009/0311418 A1 | 12/2009 | Hennige et al. | |
| 2010/0227207 A1 * | 9/2010 | Fukumoto et al. | 429/94 |

FOREIGN PATENT DOCUMENTS

| | | |
|---|---|---|
| CN | 1969407 A | 5/2007 |
| DE | 10238945 A1 | 3/2004 |
| EP | 1717885 A1 | 11/2006 |
| JP | 6302314 A | 10/1994 |
| JP | 2000-173574 | 6/2000 |
| JP | 2003-272591 | 9/2003 |
| JP | 2004-095255 | 3/2004 |
| JP | 2007273123 A | 10/2007 |
| KR | 20040020633 A | 3/2004 |
| KR | 20050103068 A | 10/2005 |
| KR | 20070091552 A | 9/2007 |
| WO | 99/15262 A1 | 4/1999 |
| WO | 0159871 A1 | 8/2001 |

OTHER PUBLICATIONS

International Search Report, PCT/KR2008/006856, dated Jun. 22, 2009.
Supplemetary European Search Report for EP 08852562 dated Oct. 19, 2011.

* cited by examiner

*Primary Examiner* — Mark F Huff
*Assistant Examiner* — Monique Wills
(74) *Attorney, Agent, or Firm* — Lerner, David, Littenberg, Krumholz & Mentlik, LLP

(57) ABSTRACT

Provided is a secondary battery comprising a separator having an inorganic layer wherein active sites of inorganic particles in the inorganic layer are modified into non-reactive sites. Use of the separator leads to improvements in wettability of an electrolyte and thermoelectric stability and storage characteristics of the secondary battery. Provided is also a method of manufacturing the same secondary battery.

7 Claims, No Drawings

SECONDARY BATTERY WITH IMPROVED STORAGE CHARACTERISTICS AND METHOD FOR MANUFACTURING THE SAME

CROSS REFERENCE TO RELATED APPLICATIONS

The present application is a continuation of Application No. 12/681,798 filed Jun. 21, 2010, which is a national phase entry under 35 U.S.C. §371 of International Application No. PCT/KR2008/006856, filed Nov. 21, 2008, published in English, which claims priority from Korean Patent Application No. 10-2007-0119118, filed Nov. 21, 2007. The disclosures of said applications are incorporated by reference herein.

TECHNICAL FIELD

The present invention relates to a secondary battery with improved storage characteristics and a method for manufacturing the same.

BACKGROUND ART

With recent trends toward miniaturization and weight reduction of electronic equipment, there is also a great demand for a slim and light-weight structure of batteries that are employed as a power source of portable electronic equipment. As a result, lithium-based secondary batteries are now practically available as a battery that is capable of accomplishing high charge/discharge capacity while having a small size.

Lithium ion batteries are being used as power sources for small-size electronic equipment and gradually find a broad range of their applicability extending to electric vehicles (EVs), electric bikes, etc. To this end, there is a need for development of a lithium ion battery having superior high-temperature storage and life span characteristics to those required in conventional small-size batteries. In particular, the lithium ion battery for a power source of hybrid EVs requires improvements of stability and long-term storage characteristics.

Generally, the lithium secondary battery uses a metal oxide such as $LiCoO_2$ as a cathode active material and a carbon material as an anode active material and is fabricated by disposition of a porous polyolefin separator between the anode and the cathode, followed by injection of a non-aqueous electrolyte containing a lithium salt such as $LiPF_6$. Upon charging, lithium ions deintercalate from the cathode active material and intercalate into a carbon layer of the anode. In contrast, upon discharging, lithium ions deintercalate from the carbon layer of the anode and intercalate into the cathode active material. Here, the non-aqueous electrolyte serves as a passage through which lithium ions migrate between the anode and the cathode.

The separator is a crucial element of the lithium ion battery, and it prevents a possible short circuit between electrodes and facilitates ionic migration. In the lithium ion battery, the separator not only serves to electrically isolate the cathode and the anode from each other, but also plays an important role in improvements of battery stability.

The lithium ion battery is a battery that does not adopt metallic lithium and has high stability. However, it disadvantageously requires a variety of measures to prevent battery fire that may result from use of numerous combustible materials as constituent components of the battery, such as Li—LiC, electrolytes, etc. Polyolefin-based separators have been conventionally used as a separator of the lithium ion battery. In order to meet improvement of battery stability, organic/inorganic composite films have been recently introduced as a separator.

Provision of the organic/inorganic composite film using an inorganic material in a coat of the separator increases wettability of the electrolyte and significantly improves electrical and thermal stability of the lithium ion battery.

Unfortunately, the use of the organic/inorganic composite film results in significant deterioration of long-term storage characteristics.

Prevention of resistance increases occurring upon storage of the battery particularly at high temperatures is especially important in the battery as a power source for motor vehicles (EVs and HEVs), requiring instantaneous high-power output. Therefore, there is an urgent need for development of a lithium ion battery with combination of excellent stability and storage characteristics.

TECHNICAL PROBLEM

Therefore, the present invention has been made in view of the above problems, and it is an object of the present invention to provide a method for manufacturing a lithium ion battery which is capable of achieving excellent storage characteristics while securing thermal and electrical stability of the battery, through the use of a modified organic/inorganic composite film as a separator.

TECHNICAL SOLUTION

In accordance with an aspect of the present invention, the above and other objects can be accomplished by the provision of a secondary battery comprising a separator having an inorganic layer wherein active sites of inorganic particles in the inorganic layer are modified into non-reactive sites.

In accordance with another aspect of the present invention, there is provided a method for manufacturing a secondary battery comprising the step of preparing a separator: including stirring inorganic particles and a solution containing a modifying agent to modify the inorganic particles, preparing a slurry containing the modified inorganic particles, a solvent and a resin and applying the slurry to at least one surface of an organic film to form an inorganic layer.

Further, the modifying agent may have a functional group that reacts with an OH group of inorganic particles.

Further, the modifying agent may have at least one functional group selected from the group consisting of phosphonate, phosphate, phosphonic acid, silane, and carboxylic acid.

Further, the modifying agent may be at least one material selected from the group consisting of dimethyl dimethoxy silane, dimethyl diethoxy silane, methyl trimethoxy silane, vinyl trimethoxy silane, phenyl trimethoxy silane, tetraethoxy silane, phenyl phosphonic acid, methyl phosphonic acid, triphenyl phosphate, diethylmethyl phosphonate, octanoic acid, gallic acid, and aminobenzoic acid.

Further, the functional group of the modifying agent and the OH group of the inorganic particles may be mixed and stirred in a molar ratio of 1:5 to 1:10.

In accordance with yet another aspect of the present invention, there is provided a method for manufacturing a secondary battery comprising the step of preparing a separator: including preparing a slurry containing a modifying agent, inorganic particles, a solvent and a resin, and applying the slurry to at least one surface of an organic separator to form an inorganic layer.

Further, the modifying agent may have a functional group that reacts with an OH group of the inorganic particles.

Further, the modifying agent may have at least one functional group selected from the group consisting of phosphonate, phosphate, phosphonic acid, silane, and carboxylic acid.

Further, the modifying agent may be at least one material selected from the group consisting of dimethyl dimethoxy silane, dimethyl diethoxy silane, methyl trimethoxy silane, vinyl trimethoxy silane, phenyl trimethoxy silane, tetraethoxy silane, phenyl phosphonic acid, methyl phosphonic acid, triphenyl phosphate, diethylmethyl phosphonate, octanoic acid, gallic acid, and aminobenzoic acid.

Further, the modifying agent may be added in the range of 1 to 20 wt %, based on the total weight of slurry.

In accordance with a further aspect of the present invention, there is provided a method for manufacturing a secondary battery comprising the step of preparing an electrolyte: including preparing an electrolyte containing an additive having a functional group reactive with an OH group, an electrolyte salt and a solvent.

Further, the additive may include at least one material selected from the group consisting of dimethyl dimethoxy silane, dimethyl diethoxy silane, methyl trimethoxy silane, vinyl trimethoxy silane, phenyl trimethoxy silane, tetraethoxy silane, phenyl phosphonic acid, methyl phosphonic acid, triphenyl phosphate, diethylmethyl phosphonate, octanoic acid, gallic acid, and aminobenzoic acid.

Further, the additive may be added in the range of 0.1 wt % to 3 wt %, based on the total weight of the electrolyte.

ADVANTAGEOUS EFFECTS

The present invention provides a secondary battery which is capable of achieving improvements in wettability of an electrolyte and thermoelectric stability of a battery through the use of a separator having an inorganic layer, and which is also capable of achieving excellent long-term storage characteristics through modification of the inorganic layer, and a method of manufacturing the same.

BEST MODE

A secondary battery in accordance with the present invention includes a separator having an inorganic layer formed on at least one side of an organic separator.

The inorganic layer has a structure with modification of active sites of inorganic particles into non-reactive sites.

The separator in the form of an organic/inorganic composite film is prepared by coating a mixed slurry of a solvent, a resin and inorganic particles on an organic layer using a conventional method such as dip coating, die coating, roll coating, comma coating or any combination thereof, and drying the resulting coat to form an organic/inorganic composite film. When such an organic/inorganic composite film is used as a separator, stability of the battery increases. However, upon long-term storage of the lithium ion battery under high temperature conditions, moisture present at the time of battery fabrication adheres to increase resistance, thus resulting in deterioration of battery performance. In particular, an inorganic material forming the separator is hydrophilic, which results in strong chemical adsorption of moisture, so long-term storage characteristics of the battery are significantly deteriorated. However, in the lithium ion battery in accordance with the present invention, inorganic particles of the inorganic layer constituting the separator are modified into non-reactive sites, consequently inhibiting the risk of side reactions that may occur between moisture and electrolytes, or the like. As a result, electrical and thermal stability and electrolyte wettability are improved and excellent high-temperature storage characteristics are also obtained.

The separator is prepared by coating an inorganic particle-containing slurry on an organic film to form an inorganic layer. Coating of the slurry may be carried out by any conventional method known in the art, such as dip coating, die coating, roll coating, comma coating or any combination thereof.

The organic film is preferably selected from a polyethylene separator, a polypropylene separator, a polyethylene/polypropylene bilayer separator, a polyethylene/polypropylene/polyethylene trilayer separator, a polypropylene/polyethylene/polypropylene trilayer separator, an organic fiber filter paper and a ceramic separator.

The slurry is prepared by mixing and dispersing inorganic particles and a heat-resistant resin in a solvent, using a disperser. The inorganic particles are supplied typically in a powder form, and are preferably formed of at least one metal oxide which is selected from the group consisting of alumina, titanium oxide, zirconium oxide, zinc oxide, silicon dioxide and magnesium oxide.

Modification of the inorganic particles is carried out by inclusion of a modifying agent in a solvent (such as acetone, alcohol, etc.) prior to introduction of the particles into the slurry. The reaction may be carried out at room temperature to 60° C. for 1 to 24 hours. A content of the modifying agent may be in the range of 1 to 20 wt %, based on the total weight of the slurry.

Upon mixing of the modifying agent and the inorganic particles, a molar ratio of a functional group of the modifying agent and OH group of the inorganic particles is preferably in the range of 1:5 to 1:10.

The modifying agent may have at least one functional group selected from the group consisting of phosphonate or phosphate (P=O), phosphonic acid (POH), silane (SiOR) and carboxylic acid (COOH).

Further, the modifying agent may be at least one material selected from the group consisting of silanes such as dimethyl dimethoxy silane, dimethyl diethoxy silane, methyl trimethoxy silane, vinyl trimethoxy silane, phenyl trimethoxy silane, and tetraethoxy silane; phosphonic acids such as phenyl phosphonic acid, and methyl phosphonic acid; phosphonates such as triphenyl phosphate, and dimethyl methyl phosphonate; and carboxylic acid such as octanoic acid, gallic acid, and aminobenzoic acid.

The separator used in the secondary battery in accordance with the present invention may also be prepared with addition of a modifying agent to the slurry which is intended for the formation of an inorganic layer. In this case, the modifying agent having a functional group reactive with an OH group is added to a slurry containing inorganic particles, a solvent and a resin, and the resulting slurry is coated on a surface of an organic film, followed by drying to prepare a separator.

The slurry is sufficiently mixed such that modification of the inorganic particles with the modifying agent can be sufficiently obtained, and the slurry is then coated on the organic film to thereby form an inorganic layer.

The modifying agent may have at least one functional group selected from the group consisting of phosphonate or phosphate (P=O), phosphonic acid (POH), silane (SiOR) and carboxylic acid (COOH).

Preferably, the modifying agent may be at least one material selected from the group consisting of silanes such as dimethyl dimethoxy silane, dimethyl diethoxy silane, methyl trimethoxy silane, vinyl trimethoxy silane, phenyl trimethoxy silane, and tetraethoxy silane; phosphonic acids such as phenyl phosphonic acid, and methyl phosphonic acid; phosphonates such as triphenyl phosphate, and dimethyl methyl phosphonate; and carboxylic acid such as octanoic acid, gallic acid, and aminobenzoic acid.

If a content of the modifying agent is lower than 1 wt %, substantially no reaction takes place. On the other hand, if a content of the modifying agent is higher than 10 wt %, there is substantially no difference in storage characteristics, when compared with addition of 1 to 10 wt %. Therefore, a content of the modifying agent in the slurry is preferably in the range of 1 to 10 wt %.

Further, a secondary battery in accordance with the present invention may also be fabricated with addition of an additive having a functional group reactive with an OH group to an electrolyte.

The electrolyte is introduced into a battery at the final step of fabrication of a lithium secondary battery. The electrolyte contains a solvent and a lithium salt.

Examples of the lithium salt that can be used in the present invention may include $LiClO_4$, $LiCF_3SO_3$, $LiAsF_5$, $LiBF_4$, $LiN(CF_3SO_2)_2$, $LiPF_6$, $LiSCN$, and $LiC(CF_3SO_2)_3$.

There is no particular limit to the solvent that can be used in the present invention, as long as it can be employed in the electrolyte. The solvent may be at least one selected from the group consisting of aprotic high-dielectric-constant solvents such as ether, tetrahydrofuran, 1,2-dimethoxyethane, 1,2-diethoxy ethane, 1,3-dioxolane, sulfolane, methylsulfolane, acetonitrile, ethylene carbonate, propylenecarbonate, and butylene carbonate; and aprotic low-viscosity solvents such as dimethyl carbonate, ethyl methyl carbonate, diethyl carbonate, methyl propyl carbonate, propionitrile, anisole, and acetic acid esters (e.g. methyl acetate) or propionic acid esters.

The additive that can be used in the present invention may be one having a functional group that reacts with an OH group.

Further, the additive may have at least one functional group selected from the group consisting of phosphonate or phosphate (P=O), phosphonic acid (POH), silane (SiOR), and carboxylic acid (COOH).

Preferably, the additive may be at least one selected from the group consisting of silanes such as dimethyl dimethoxy silane, dimethyl diethoxy silane, methyl trimethoxy silane, vinyl trimethoxy silane, phenyl trimethoxy silane and tetraethoxy silane; phosphonic acids such as phenyl phosphonic acid and methyl phosphonic acid; phosphonates such as triphenyl phosphate and dimethyl methyl phosphonate; and carboxylic acids such as octanoic acid, gallic acid and aminobenzoic acid.

If a content of the additive is lower than 0.1 wt %, there is substantially no improvement of long-term storage characteristics. On the other hand, if a content of the additive is higher than 3 wt %, there is substantially no further improved effect, when compared with addition of 0.1 to 3 wt %. Therefore, a content of the additive is preferably in the range of 0.1 to 3 wt %.

In addition, the electrolyte may further comprise an overcharge inhibitor, a life enhancer, and the like. Examples of the overcharge inhibitor may include biphenyl, alkylbiphenyl, cyclohexylbenzene, t-butylbenzene, diphenyl ether, benzofuran, and the like. Examples of the life enhancer may include vinylene carbonate, methylvinylene carbonate, ethylvinylene carbonate, 4-vinylethylene carbonate, and the like.

EXAMPLES

Now, the present invention will be described in more detail with reference to the following Examples. These examples are provided only for illustrating the present invention and should not be construed as limiting the scope and spirit of the present invention.

Example 1

Preparation of Cathode 88 wt % of $LiCoO_2$ (cathode active material), 6.5 wt % of carbon black (conductive material), and 5.5 wt % of PVdF (binder) were mixed in a solvent of N-methyl-2-pyrrolidone (NMP) to prepare a cathode mixture slurry. The resulting cathode mixture slurry was applied to aluminum foil having a thickness of 20 μm and then dried to prepare a cathode, followed by roll pressing.

Preparation of Anode 92 wt % of carbon powder (anode active material), 6 wt % of PVdF (binder), and 2 wt % of carbon black (conductive material) were mixed in a solvent of N-methyl-2-pyrrolidone (NMP) to prepare an anode mixture slurry. The resulting anode mixture slurry was applied to copper foil having a thickness of 20 μm and then dried to prepare an anode, followed by roll pressing.

Preparation of Separator $Al_2O_3$ powder was added to a solution of 10 wt % dimethyl methyl phosphonate (DMMP) in acetone and the mixture was stirred at room temperature for 24 hours to result in modification of the $Al_2O_3$ powder.

About 5 wt % of a polyvinylidene fluoride-chlorotrifluoroethylene (PVdF-CTFE) copolymer was added to acetone and dissolved at 50° C. for about 12 hours to prepare a polymer solution. The $Al_2O_3$ powder was added to the polymer solution, such that a ratio of the polymer solution:$Al_2O_3$ was in a range of 80:20 (w/w). The $Al_2O_3$ powder was then crushed and ground for 12 hours or more by a ball-mill method, thereby preparing a slurry. The resulting slurry was coated on a polyethylene separator having a thickness of 20 μm using a dip coating method. A thickness of the coated inorganic layer was adjusted to 5 μm.

Fabrication of Secondary Battery

The as-prepared cathode, anode and separator were stacked to fabricate an electrode assembly. Thereafter, as an electrolyte, a solution of 1M lithium hexafluorophosphate ($LiPF_6$) in ethylene carbonate (EC) and ethyl methyl carbonate (EMC) (1:2, v/v) was injected into the electrode assembly to thereby fabricate a lithium secondary battery.

Example 2

Preparation of Separator

About 5 wt % of a polyvinylidene. fluoride-chlorotrifluoroethylene (PVdF-CTFE) copolymer was added to acetone and dissolved at 50° C. for about 12 hours to prepare a polymer solution. $Al_2O_3$ powder was added to the polymer solution, such that a ratio of the polymer solution:$Al_2O_3$ was in a range of 80:20 (w/w). The $Al_2O_3$ powder was then crushed and ground for 12 hours or more by a ball-mill method, thereby preparing a slurry. 5 wt % of dimethyl methyl phosphonate (DMMP) was added to the resulting slurry. The slurry was coated on a polyethylene separator having a thickness of 20 μm using a dip coating method. A thickness of the coated inorganic layer was adjusted to 5 μm.

A cathode, an anode, and a secondary battery were prepared in the same manner as in Example 1.

Example 3

Preparation of Separator

About 5 wt % of a polyvinylidene fluoride-chlorotrifluoroethylene (PVdF-CTFE) copolymer was added to acetone and dissolved at 50° C. for about 12 hours to prepare a polymer solution. $Al_2O_3$ powder was added to the polymer solution, such that a ratio of the polymer solution:$Al_2O_3$ was in a range of 80:20 (w/w). The $Al_2O_3$ powder was then crushed and ground for 12 hours or more by a ball-mill method, thereby preparing a slurry. The resulting slurry was coated on a polyethylene separator having a thickness of 20 µm using a dip coating method. A thickness of the coated inorganic layer was adjusted to 5 µm.

Fabrication of Secondary Battery

The as-prepared cathode, anode and separator were stacked to fabricate an electrode assembly. Thereafter, as an electrolyte, a solution of 1M $LiPF_6$ in EC and EMC (1:2, v/v) and 0.97 wt % of dimethyl methyl phosphonate (DMMP) were injected into the electrode assembly to thereby fabricate a lithium secondary battery.

A cathode and an anode were prepared in the same manner as in Example 1.

Example 4

A lithium secondary battery was fabricated in the same manner as in Example 1, except that $Al_2O_3$ powder was modified with a solution containing triphenyl phosphate (TPP) instead of DMMP.

Example 5

A lithium secondary battery was fabricated in the same manner as in Example 2, except that a slurry contained TPP instead of DMMP.

Example 6

A lithium secondary battery was fabricated in the same manner as in Example 3, except that TPP instead of DMMP was added to an electrolyte.

Example 7

A lithium secondary battery was fabricated in the same manner as in Example 1, except that $Al_2O_3$ powder was modified with a solution containing dimethyldimethoxysilane (DMDS) instead of DMMP.

Example 8

A lithium secondary battery was fabricated in the same manner as in Example 2, except that a slurry contained DMDS instead of DMMP.

Example 9

A lithium secondary battery was fabricated in the same manner as in Example 3, except that DMDS instead of DMMP was added to an electrolyte.

Comparative Example 1

Preparation of Cathode 88 wt % of $LiCoO_2$ (cathode active material), 6.5 wt % of carbon black (conductive material), and 5.5 wt % of PVdF (binder) were mixed in a solvent of N-methyl-2-pyrrolidone (NMP) to prepare a cathode mixture slurry. The resulting cathode mixture slurry was applied to aluminum foil having a thickness of 20 µm and then dried to prepare a cathode, followed by roll pressing.

Preparation of Anode 92 wt % of carbon powder (anode active material), 6 wt % of PVdF (binder), and 2 wt % of carbon black (conductive material) were mixed in a solvent of N-methyl-2-pyrrolidone (NMP) to prepare an anode mixture slurry. The resulting anode mixture slurry was applied to copper foil having a thickness of 20 µm and then dried to prepare an anode, followed by roll pressing.

Preparation of Separator

About 5 wt % of a polyvinylidene fluoride-chlorotrifluoroethylene (PVdF-CTFE) copolymer was added to acetone and dissolved at 50° C. for about 12 hours to prepare a polymer solution. $Al_2O_3$ powder was added to the polymer solution, such that a ratio of the polymer solution:$Al_2O_3$ was in a range of 80:20 (w/w). The $Al_2O_3$ powder was then crushed and ground for 12 hours or more by a ball-mill method, thereby preparing a slurry. The resulting slurry was coated on a polyethylene separator having a thickness of 20 µm using a dip coating method. A thickness of the coated inorganic layer was adjusted to 5 µm.

Fabrication of Secondary Battery

The as-prepared cathode, anode and separator were stacked to fabricate an electrode assembly. Thereafter, as an electrolyte, a solution of 1M lithium hexafluorophosphate ($LiPF_6$) in ethylene carbonate (EC) and ethyl methyl carbonate (EMC) (1:2, v/v) was injected into the electrode assembly to thereby fabricate a lithium secondary battery.

TABLE 1

High-temperature resistant performance of secondary batteries as fabricated in the present invention.

|  | Resistance increase (%) |
| --- | --- |
| Example 1 | 18.3% |
| Example 2 | 20.4% |
| Example 3 | 21.2% |
| Example 4 | 17.2% |
| Example 5 | 19.8% |
| Example 6 | 20.1% |
| Example 7 | 11.3% |
| Example 8 | 12.5% |
| Example 9 | 14.7% |
| Comparative Example 1 | 24.9% |

The invention claimed is:

1. An organic/inorganic composite separator for a secondary battery comprising:
    an organic layer selected from the group consisting of a polyethylene layer, a polypropylene layer, a polyethylene/polypropylene bilayer, a polyethylene/polypropylene/polyethylene trilayer, a polypropylene/polyethylene/polypropylene trilayer, and an organic fiber filter paper layer; and
    an inorganic layer comprising inorganic particles and a modifying agent,
    wherein the inorganic particles comprise an OH group and at least one selected from the group consisting of alumina, titanium oxide, zirconium oxide, zinc oxide, silicon dioxide, and magnesium oxide;

the modifying agent comprises at least one functional group selected from the group consisting of phosphonate, phosphate, phosphonic acid, and carboxylic acid;

a molar ratio of the OH group of the inorganic particles and the functional group of the inorganic modifying agent is from 5:1 to 10:1; and at least one surface of the organic layer is coated with the inorganic layer.

2. The separator according to claim 1, wherein the modifying agent comprises at least one selected from the group consisting of phenyl phosphonic acid, methyl phosphonic acid, triphenyl phosphate, dimethylmethyl phosphonate, diethylmethyl phosphonate, octanoic acid, gallic acid, and aminobenzoic acid.

3. The separator according to claim 1, wherein the inorganic layer is formed on at least a surface of the organic layer by preparing slurry containing the inorganic particles, the modifying agent, a solvent, and a resin, and coating the surface of the organic layer with the slurry.

4. The separator according to claim 3, wherein the slurry is prepared by stirring the inorganic particles and the modifying agent in the solvent to modify the inorganic particles and then mixing the modified inorganic particles and the solvent with the resin.

5. A method for manufacturing a an organic/inorganic composite separator, the method comprising the steps of:

preparing slurry comprising 1 wt% to 20 wt% of a modifying agent, inorganic particles, a solvent, and a resin, wherein the inorganic modifying agent comprises at least one functional group selected from the group consisting of phosphonate, phosphate, phosphonic acid, and carboxylic acid, and the inorganic particles comprise at least one selected from the group consisting of alumina, titanium oxide, zirconium oxide, zinc oxide, silicon dioxide, and magnesium oxide; and forming an inorganic layer by coating at least a surface of an organic layer with the slurry, wherein the organic layer is a layer selected from the group consisting of a polyethylene layer, a polypropylene layer, a polyethylene/polypropylene bilayer, a polyethylene/polypropylene/polyethylene trilayer, a polypropylene/polyethylene/polypropylene trilayer, and an organic fiber filter paper layer.

6. The method according to claim 5, wherein the modifying agent comprises at least one selected from the group consisting of phenyl phosphonic acid, methyl phosphonic acid, triphenyl phosphate, dimethylmethyl phosphonate, diethylmethyl phosphonate, octanoic acid, gallic acid, and aminobenzoic acid.

7. The method according to claim 5, wherein the step of preparing slurry comprises the steps of:

modifying the inorganic particles by stirring a solution containing the modifying agent and the inorganic particles until a molar ratio of the functional group of the modifying agent and an OH group included in the inorganic particles becomes 1:5 to 1:10; and mixing the resin to the solution containing the modifying inorganic particles.

* * * * *